United States Patent
Dutta et al.

(10) Patent No.: US 8,705,436 B2
(45) Date of Patent: Apr. 22, 2014

(54) ADAPTIVE SPOTBEAM BROADCASTING, SYSTEMS, METHODS AND DEVICES FOR HIGH BANDWIDTH CONTENT DISTRIBUTION OVER SATELLITE

(75) Inventors: Santanu Dutta, Cary, NC (US); Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 2213 days.

(21) Appl. No.: 11/669,481

(22) Filed: Jan. 31, 2007

(65) Prior Publication Data

US 2007/0192805 A1    Aug. 16, 2007

Related U.S. Application Data

(60) Provisional application No. 60/773,490, filed on Feb. 15, 2006.

(51) Int. Cl.
| | |
|---|---|
| *H04J 3/08* | (2006.01) |
| *H04B 7/185* | (2006.01) |
| *H04W 4/00* | (2009.01) |
| *H04N 7/20* | (2006.01) |

(52) U.S. Cl.
USPC ............. 370/326; 455/12.1; 455/427; 725/63

(58) Field of Classification Search
USPC .................. 370/316, 326; 725/39, 56, 63, 64; 455/12.1, 427
See application file for complete search history.

(56) References Cited

U.S. PATENT DOCUMENTS

| | | |
|---|---|---|
| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |

(Continued)

FOREIGN PATENT DOCUMENTS

| | | |
|---|---|---|
| EP | 0 506 255 A2 | 9/1992 |
| EP | 0 597 225 A1 | 5/1994 |

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner* — Ayaz Sheikh
*Assistant Examiner* — Hoang-Chuong Vu
(74) *Attorney, Agent, or Firm* — Myers Bigel Sibley & Sajovec, P.A.

(57) ABSTRACT

Satellite broadcasting methods include providing a cellular satellite communications system configured to transmit information separately to a plurality of different geographic locations defined by a respective plurality of cellular satellite spotbeams, and concurrently transmitting a program signal on a plurality of different spotbeams. The plurality of different spotbeams may include less than a total number of spotbeams of the cellular satellite communications system. The plurality of different spotbeams may be selected adaptively from an available pool of spotbeams based on locations of users requesting the broadcast program signal. Corresponding satellite gateways, broadcast controllers and wireless user terminals are also provided.

6 Claims, 8 Drawing Sheets

(56) References Cited

U.S. PATENT DOCUMENTS

| | | |
|---|---|---|
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A * | 8/1999 | Mallinckrodt ............. 455/422.1 |
| 5,978,365 A * | 11/1999 | Yi ................................ 370/331 |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,211,901 B1 * | 4/2001 | Imajima et al. ................. 725/93 |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,707 B1 | 1/2002 | Wainfan et al. |
| 6,418,147 B1 | 7/2002 | Wiedeman |
| 6,449,461 B1 | 9/2002 | Otten |
| 6,522,865 B1 | 2/2003 | Otten |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 | 8/2004 | Wiedeman et al. |
| 6,785,543 B2 | 8/2004 | Karabinis |
| 6,798,791 B1 * | 9/2004 | Riazi et al. .................... 370/515 |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 7,092,708 B2 | 8/2006 | Karabinis |
| 7,113,743 B2 | 9/2006 | Karabinis |
| 7,113,778 B2 | 9/2006 | Karabinis |
| 2002/0122408 A1 | 9/2002 | Mullins |
| 2002/0144278 A1 * | 10/2002 | Pratts et al. ..................... 725/93 |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0054762 A1 | 3/2003 | Karabinis |
| 2003/0149986 A1 | 8/2003 | Mayfield et al. |
| 2003/0153308 A1 | 8/2003 | Karabinis |
| 2003/0187981 A1 * | 10/2003 | Berrada ........................ 709/225 |
| 2004/0072539 A1 * | 4/2004 | Monte et al. ................. 455/13.4 |
| 2004/0072561 A1 * | 4/2004 | LaPrade ....................... 455/427 |
| 2004/0102156 A1 | 5/2004 | Loner |
| 2004/0121727 A1 | 6/2004 | Karabinis |
| 2004/0142660 A1 | 7/2004 | Churan |
| 2004/0192200 A1 | 9/2004 | Karabinis |
| 2004/0192293 A1 | 9/2004 | Karabinis |
| 2004/0192395 A1 | 9/2004 | Karabinis |
| 2004/0203393 A1 | 10/2004 | Chen |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0068915 A1 | 3/2005 | Efraim et al. |
| 2005/0079816 A1 | 4/2005 | Singh et al. |
| 2005/0090256 A1 | 4/2005 | Dutta |
| 2005/0118948 A1 | 6/2005 | Karabinis et al. |
| 2005/0123076 A1 * | 6/2005 | Walker et al. ................. 375/341 |
| 2005/0136836 A1 | 6/2005 | Karabinis et al. |
| 2005/0136930 A1 * | 6/2005 | Dent ............................. 455/445 |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 * | 10/2005 | Karabinis ..................... 455/12.1 |
| 2005/0227618 A1 | 10/2005 | Karabinis et al. |
| 2005/0239399 A1 * | 10/2005 | Karabinis .................... 455/3.02 |
| 2005/0239403 A1 | 10/2005 | Karabinis |
| 2005/0239404 A1 | 10/2005 | Karabinis |
| 2005/0239457 A1 * | 10/2005 | Levin et al. ................... 455/431 |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 * | 12/2005 | Karabinis et al. ............. 370/316 |
| 2005/0272369 A1 | 12/2005 | Karabinis et al. |
| 2005/0273822 A1 * | 12/2005 | Snell et al. ...................... 725/64 |
| 2005/0276239 A1 * | 12/2005 | Smallcomb et al. .......... 370/316 |
| 2005/0282542 A1 | 12/2005 | Karabinis |
| 2005/0288011 A1 | 12/2005 | Dutta |
| 2006/0040613 A1 | 2/2006 | Karabinis et al. |
| 2006/0040657 A1 | 2/2006 | Karabinis et al. |
| 2006/0040659 A1 | 2/2006 | Karabinis |
| 2006/0094352 A1 | 5/2006 | Karabinis |
| 2006/0094420 A1 | 5/2006 | Karabinis |
| 2006/0105707 A1 | 5/2006 | Karabinis |
| 2006/0111041 A1 | 5/2006 | Karabinis |
| 2006/0111056 A1 | 5/2006 | Dutta |
| 2006/0135058 A1 * | 6/2006 | Karabinis ..................... 455/3.06 |
| 2006/0135060 A1 | 6/2006 | Karabinis |
| 2006/0135070 A1 | 6/2006 | Karabinis |
| 2006/0165120 A1 | 7/2006 | Karabinis |
| 2006/0189274 A1 | 8/2006 | Karabinis |
| 2006/0189275 A1 | 8/2006 | Karabinis |
| 2006/0189309 A1 | 8/2006 | Good et al. |
| 2006/0189310 A1 * | 8/2006 | Sherman ....................... 455/428 |
| 2006/0194576 A1 | 8/2006 | Karabinis et al. |
| 2006/0205346 A1 | 9/2006 | Evans et al. |
| 2006/0205347 A1 | 9/2006 | Karabinis |
| 2006/0205367 A1 | 9/2006 | Karabinis |
| 2006/0211371 A1 | 9/2006 | Karabinis et al. |
| 2006/0211419 A1 | 9/2006 | Karabinis |
| 2006/0211452 A1 | 9/2006 | Karabinis |
| 2006/0217070 A1 | 9/2006 | Karabinis |
| 2006/0232465 A1 | 10/2006 | Levin et al. |
| 2006/0233147 A1 | 10/2006 | Karabinis |
| 2006/0246838 A1 | 11/2006 | Karabinis |
| 2006/0252368 A1 | 11/2006 | Karabinis |
| 2006/0276129 A1 | 12/2006 | Karabinis |
| 2006/0292990 A1 | 12/2006 | Karabinis et al. |
| 2007/0282607 A1 * | 12/2007 | Bond et al. .................... 704/260 |

(56) References Cited

U.S. PATENT DOCUMENTS

| | | | |
|---|---|---|---|
| 2009/0323869 A1* | 12/2009 | Elam | 375/343 |
| 2011/0034166 A1* | 2/2011 | Karabinis et al. | 455/427 |
| 2012/0122449 A1* | 5/2012 | Monte et al. | 455/427 |

FOREIGN PATENT DOCUMENTS

| | | |
|---|---|---|
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| GB | 2 40 630 A | 1/2005 |
| GB | 2 405 555 A | 3/2005 |
| WO | WO 01/54314 A1 | 7/2001 |

OTHER PUBLICATIONS

Ayyagari et al., "A satellite-augmented cellular network concept", *Wireless Networks*, Vo. 4, 1998, pp. 189-198.

International Search Report and Written Opinion for PCT/US2007/003689; Sep. 13, 2007.

Invitation to Pay Additional Fees for PCT/US2007/003689; date of mailing Jun. 27, 2007.

* cited by examiner

ADAPTIVE SPOTBEAM BROADCASTING, SYSTEMS, METHODS AND DEVICES FOR HIGH BANDWIDTH CONTENT DISTRIBUTION OVER SATELLITE

CROSS REFERENCE TO RELATED APPLICATION

The present application claims the benefit of and priority to U.S. Provisional Patent Application No. 60/773,490, filed Feb. 15, 2006, entitled "Adaptive Spotbeam Broadcasting, Systems, Methods And Devices For High Bandwidth Content Distribution Over Satellite," the disclosure of which is hereby incorporated herein by reference in its entirety.

FIELD OF THE INVENTION

This invention relates to wireless communications systems, methods and devices, and more particularly to satellite broadcasting systems, methods and devices.

BACKGROUND

Wireless broadcasting is well known for television and radio content. As used herein, "broadcasting" means simultaneously sending the same content to multiple recipients. A distinction is sometimes made between broadcasting and multicasting, wherein broadcasting sends the content to everyone on a network, whereas multicasting sends content to a select list of recipients. As used herein, "broadcasting" is used generically to mean simultaneously sending the same content to all or a subset of all wireless terminals on a network.

Satellite broadcasting is widely used for multimedia (audio and/or video) content. For example, Direct Broadcast Satellite (DBS) systems, such as marketed by DirecTV and/or EchoStar, broadcast television content to fixed and/or mobile terminals. Satellite radio systems, such as marketed by XM-Satellite Radio and Sirius Satellite Radio, broadcast audio to fixed and/or mobile terminals.

Broadcasting of high bandwidth multimedia (video as well as audio) content to relatively low gain portable wireless terminals may present a challenge. In particular, high bandwidth streaming media, such as video and/or high fidelity audio over satellite, may present particular challenges. More specifically, in wide area broadcasting, it is desirable for adequate power flux density to be provided by the satellite over the entirety of a targeted coverage area. Such an area might be, for example, substantially all of the United States and Southern Canada. When the coverage area is large, as in the above example, the satellite antenna gain generally is relatively small, as the antenna gain generally is inversely proportional to the coverage area that it must span. However, high bandwidth content generally requires/uses high power because it generally provides transmission at a high information rate. Thus, the broadcast of such content over a large area may use a relatively high level of aggregate effective isotropic radiated power, or AEIRP, in the satellite. This tends to make the satellite complex and expensive.

Conventionally, dedicated broadcast satellites have used relatively low gain antennas coupled to relatively high gain Power Amplifiers (PAs). Even then, it may be difficult to provide video broadcast to user terminals with low antenna gain, such as cellular/PCS terminals, over large coverage areas, although trials involving direct satellite broadcast to hand held devices over relatively small geographic areas have been conducted. FIG. 1 shows an example of a satellite coverage map for a single-beam broadcast satellite covering a geographic area of the USA and Southern Canada.

As used herein, the term "user terminal" includes terrestrial cellular and/or satellite cellular radioterminals with or without a multi-line display; terminals that may combine a radioterminal with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) and/or GLONASS receiver; and/or conventional laptop and/or palmtop computers or other appliances, which include a radio frequency transceiver. As used herein, the term "user terminal" also includes any other wireless user device that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space. A user terminal also may be referred to herein as a "cellular radiotelephone," "cellular terminal", "radiotelephone", "wireless terminal" or simply as a "terminal."

SUMMARY

Some embodiments of the invention provide satellite broadcasting methods that include providing information to a plurality of user terminals in at least one satellite spotbeam in response to receiving a request for the information from at least a threshold number of user terminals within the at least one satellite spotbeam.

The methods may further include receiving an indication that one of the plurality of user terminals in the at least one spotbeam has terminated receiving the information, determining if the threshold number of user terminals in the at least one satellite spotbeam are receiving the information, and in response to a determination that fewer than the threshold number of user terminals are receiving the information in the at least one spotbeam, terminating transmission of the information in the at least one spotbeam. The threshold number of user terminals may be one. Providing the information may include broadcasting a program signal over a broadcast channel.

The methods may further include transmitting intelligence regarding the information in the at least one satellite spotbeam. The intelligence identifies a start time, end time, time slot, frequency, spreading code and/or subchannel(s) associated with the information. The intelligence may be transmitted over a broadcast control channel. The intelligence may identify a channel, time slot, spreading code and/or frequency on which the information is broadcast in the spot beam.

The methods may further include transmitting intelligence regarding broadcasting the information in an adjacent spotbeam. The intelligence may identify a channel, time slot, spreading code and/or frequency on which the information is broadcast in the adjacent spot beam. The methods may further include transmitting intelligence regarding broadcasting the information in an ancillary terrestrial component, wherein the intelligence identifies a channel, time slot, spreading code and/or frequency on which the information is broadcast by the ancillary terrestrial component. In particular, the intelligence may identify a channel, time slot, spreading code and/or frequency on which the program is broadcast by an ancillary terrestrial component in the at least one spotbeam.

The methods may further include authenticating a user terminal in response to the request for the information. The methods may further include transmitting a decryption key to the user terminal in response to authenticating the user terminal, wherein the decryption key is configured to decrypt the information. The decryption key may be encrypted prior to being transmitted to the user terminal.

The methods may further include, if information is not being broadcast in the at least one spotbeam at a time a request for information is received from a user terminal, receiving an indication from the user terminal of an ability of the user terminal to receive information from an ancillary terrestrial component and/or from an adjacent spotbeam. Receiving the indication from the user terminal may include receiving an indication of signal quality from the user terminal. The indication of signal quality may include an indication of signal strength, signal to noise ratio, signal to interference ratio and/or bit error rate.

Providing information may include transmitting the information in the at least one spotbeam in response to the indication of signal quality being less than a threshold signal quality level. Providing information may include transmitting the information on a dedicated channel/code/time slot different from a channel/code/time slot used for two-way cellular satellite communications in the at least one spotbeam.

The methods may further include storing an indication of a program subscription by a user terminal, and, responsive to an indication that a user terminal has entered a spotbeam in which the subscribed program is being transmitted, transmitting a notification to the user terminal of the availability of the subscribed program.

The methods may further include adjusting a property of the information in response to the indication of quality received by the gateway from the user terminal. Adjusting a property of the information may include adjusting a signal level, data rate, bandwidth, and/or channel of the information. The methods may further include adjusting a property of the information if a threshold number/percent of a plurality of user terminals report a low signal quality.

Receiving an indication that the user terminal has entered the spotbeam in which the subscribed program is being broadcast may include receiving a location update from the user terminal.

Methods of receiving information broadcast in a satellite spotbeam at a user terminal according to some embodiments of the invention include registering the user terminal in the satellite spotbeam, receiving intelligence about the information from a satellite associated with the satellite spotbeam, wherein the intelligence identifies a start time, end time, time slot, frequency, spreading code and/or subchannel(s) associated with the information, and tuning a receiver in the user terminal to the time slot, frequency, spreading code and/or subchannel(s) identified in the intelligence.

Receiving the intelligence may include receiving intelligence regarding a channel/time slot/spreading code and/or subchannel(s) on which the information is broadcast in the spot beam. Receiving the intelligence may include receiving the intelligence regarding a channel/time slot/spreading code and/or subchannel(s) on which the information is broadcast in an adjacent spot beam and/or by an ancillary terrestrial component.

The methods may further include receiving components of the information from adjacent spotbeams and/or ancillary terrestrial components and combining the components of the information at the user terminal. Combining may include combining at least one signal from an adjacent spotbeam with a signal from an ancillary terrestrial component. Combining may include frequency translating the components, performing carrier, frame and/or symbol synchronization on the components, and combining the components. The methods may further include determining a signal to noise power ratio of at least one of the components, and combining may be performed in response to the at least one signal to noise power ratio.

The methods may further include determining an indication of quality of the information received at the user terminal, and providing the indication of quality of the information received at the user terminal to a satellite gateway. The indication of quality may include an indication of signal strength, signal to noise ratio, signal to interference ratio and/or bit error rate.

Satellite broadcasting methods according to some embodiments of the invention include providing a cellular satellite communications system configured to transmit information separately to a plurality of different geographic locations defined by a respective plurality of cellular satellite spotbeams, and concurrently transmitting a program signal on a plurality of different spotbeams. The plurality of different spotbeams may include less than a total number of spotbeams of the cellular satellite communications system. The plurality of different spotbeams may be selected adaptively from an available pool of spotbeams based on locations of users requesting the broadcast program signal.

The location of users may be determined using mobility management features of a cellular satellite mobile communications system employing the cellular satellite spotbeams.

Satellite broadcasting methods according to still further embodiments of the invention include providing information to a user terminal over a satellite spotbeam of a satellite system responsive to the user terminal being within the satellite spotbeam and responsive to a profile associated with the user terminal. The profile associated with the user terminal may relate to at least one preference associated with a user of the user terminal.

Providing information to a user terminal may include transmitting information from a satellite gateway to the user terminal substantially as the information becomes available to the satellite gateway. The methods may further include providing the information from a broadcast controller to the satellite gateway.

The methods may further include providing an indication from a satellite gateway to a broadcast controller that the user terminal has entered the satellite spotbeam, retrieving the profile associated with the user terminal at the broadcast controller, determining in response to the profile that the user should receive the information, and providing an indication from the broadcast controller to the satellite gateway that the user terminal should receive the information.

A satellite gateway according to some embodiments of the invention includes an antenna configured to communicate with a satellite, and a gateway controller configured to provide information to a plurality of user terminals in at least one satellite spotbeam in response to receiving a request for the information from at least a threshold number of user terminals within the at least one satellite spotbeam.

The gateway controller may be further configured to receive an indication that one of the plurality of user terminals in the at least one spotbeam has terminated receiving the information, to determine if the threshold number of user terminals in the at least one satellite spotbeam are receiving the information, and in response to a determination that fewer than the threshold number of user terminals are receiving the information in the at least one spotbeam, to terminate transmission of the information in the at least one spotbeam.

A wireless user terminal for use in a cellular satellite communications system according to some embodiments of the invention includes an antenna, a transceiver coupled to the antenna and configured to communicate with the cellular satellite communications system via a satellite air interface over satellite communication frequencies, including satellite service link forward and reverse frequencies, and a control circuit. The control circuit is configured to register the user terminal in the satellite spotbeam, to receive from a satellite associated with the satellite spotbeam intelligence about the information, wherein the intelligence identifies a start time, end time, time slot, frequency, spreading code and/or subchannel(s) associated with the information, and to tune the transceiver in the user terminal to the time slot, frequency, spreading code and/or subchannel(s) identified in the intelligence.

A satellite communication system according to some embodiments of the invention includes a satellite configured to transmit/receive information to/from user terminals in a plurality of spotbeams over a geographic footprint, a satellite gateway configured to transmit information separately to a plurality of different geographic locations defined by a respective plurality of cellular satellite spotbeams, and to concurrently transmit a program signal on a plurality of different spotbeams.

A satellite communication system according to further embodiments of the invention includes a satellite configured to transmit/receive information to/from user terminals in a plurality of spotbeams over a geographic footprint, and a satellite gateway configured to provide information to a user terminal over a satellite spotbeam of a satellite system responsive to the user terminal being within the satellite spotbeam and responsive to a profile associated with the user terminal.

The satellite communication system may further include a broadcast controller coupled to the satellite gateway. The satellite gateway may be configured to provide an indication to the broadcast controller that the user terminal has entered the satellite spotbeam, and the broadcast controller may be configured to retrieve the profile associated with the user terminal at the broadcast controller, to determine in response to the profile that the user should receive the information, and to provide an indication to the satellite gateway that the user terminal should receive the information.

Other systems, methods, and/or apparatus according to embodiments of the invention will be or become apparent to one with skill in the art upon review of the following drawings and detailed description. It is intended that all such additional systems, methods, and/or apparatus be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
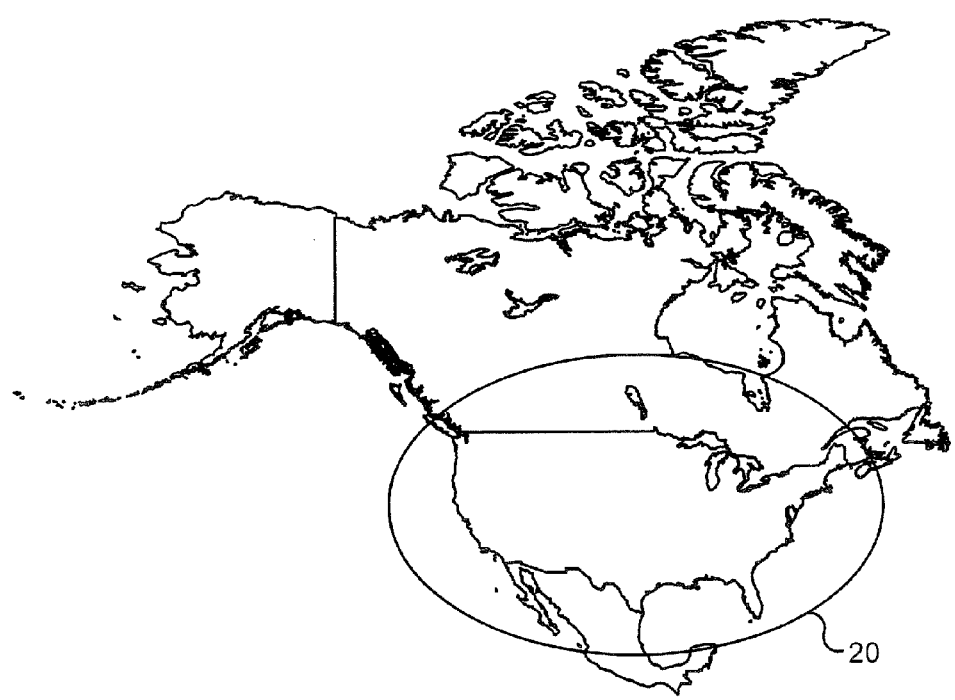
FIG. 1 illustrates a single beam satellite antenna pattern covering a wide geographic area.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or".

Some embodiments of the present invention provide multimedia content and, in some embodiments, high data rate multimedia content, such as video and/or high fidelity radio, to a relatively low antenna gain user terminal, such as, for example, a portable cellular/PCS terminal. Other embodiments of the present invention can perform content delivery over a satellite that is shared with two-way communications. Yet other embodiments of the present invention can provide ancillary terrestrial networks for satellite-based broadcasting. These embodiments may be used individually and in combination.

Figure 2:
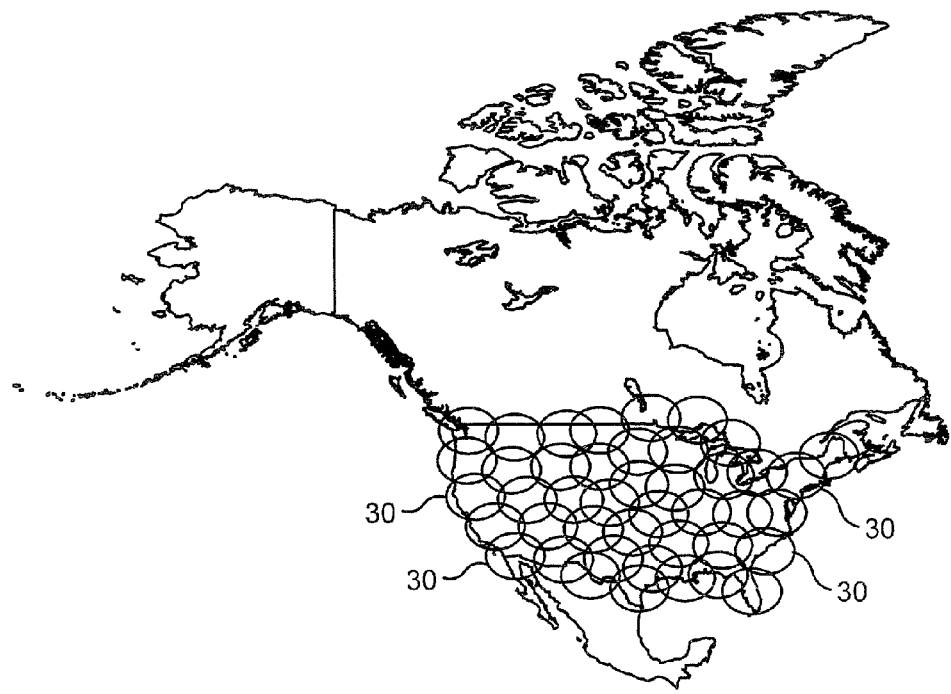
FIG. 2 illustrates a satellite antenna pattern covering a wide geographic area using multiple spotbeams.

Broadcast services and/or two-way communications services can be targeted to specific locations in a service/coverage area. Accordingly, communications satellites may use spot-beams and/or antenna patterns, which can offer the benefits of greater gain and/or link margin and increased traffic capacity through frequency reuse. However, if ubiquitous wide area broadcasting is attempted over a high-antenna-gain spotbeam satellite by "lighting up" every spot-beam with a broadcast channel, as illustrated in FIG. 2, then the AEIRP that may be used may be even greater than that which is used in broadcasting over the same area with a low antenna gain satellite. This is because spotbeam overlap is generally provided to provide ubiquitous coverage, i.e., a practical spotbeam will not have a brick-wall antenna pattern. Hence, the satellite antenna, or antenna array as is commonly used to implement spotbeam antenna systems, will radiate in directions outside its designated spotbeam coverage area. This spillover power is generally wasted. However, some embodiments of the invention may utilize this "spillover power" to provide broadcast services to user terminals that are located near, but not within, the geographic area in which a satellite spotbeam that is broadcasting a program signal provides communication services to subscriber terminals.

Figure 3A:
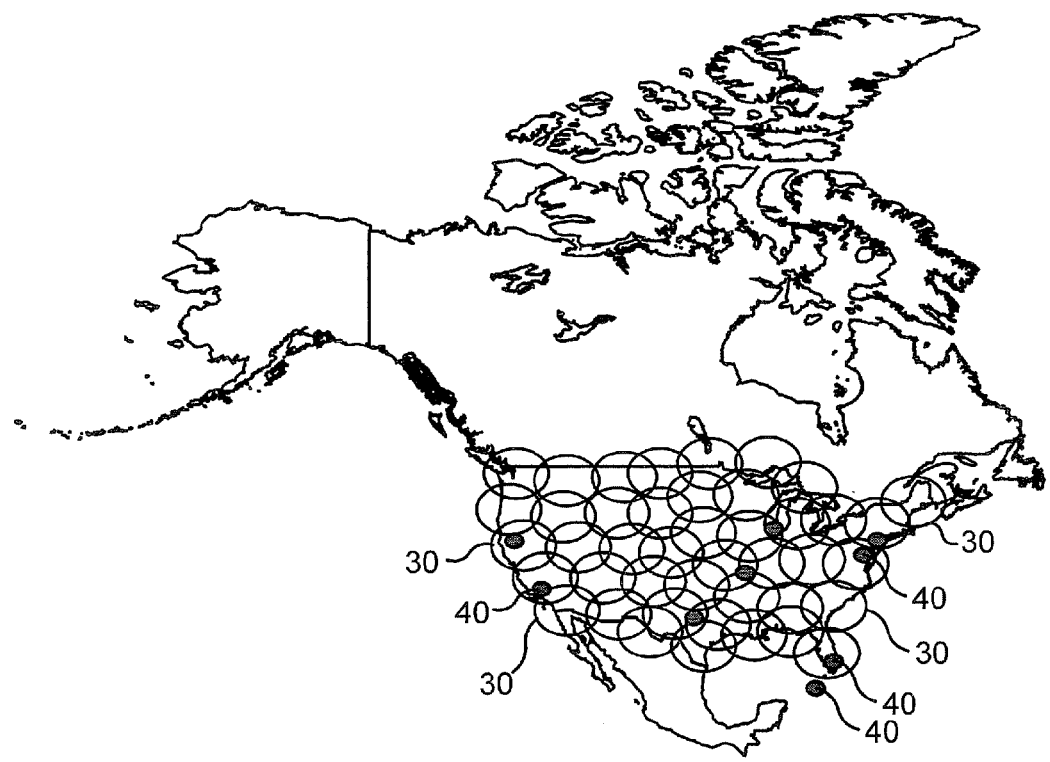
FIGS. 3A and 3B illustrate satellite antenna patterns covering a wide geographic area using multiple spot beams in conjunction with an ancillary terrestrial component.

Some embodiments of the present invention may arise from recognition that the consumers of satellite broadcast services are unlikely to be uniformly distributed throughout an entire coverage area or service region. Accordingly, some embodiments of the invention can focus radiated power on spotbeams where users desirous of receiving the broadcast service are present. This may be referred to as selective spotbeam multicasting. An example of the type of spot beam coverage that may be used is illustrated in FIG. 3A. In a specific example, if a terrestrial component exists for the broadcast service (as described in detail below), the need for the satellite component of the broadcast service may typically be greatest along highway corridors and in regions immediately outside the terrestrial component coverage zones of major metropolitan areas, thereby supplementing and augmenting the coverage of the terrestrial broadcast component.

As shown in FIG. 3A, a plurality of satellite spotbeams 30 may be arranged to substantially cover a geographic area. An ancillary terrestrial component 40 of the satellite communications system includes a plurality of ATC cells 40 located in regions of high population density. A program signal broadcast by a satellite according to some embodiments of the invention may be selectively transmitted in all or less than all spotbeams. Referring to FIG. 3A, it can be seen that some of the spotbeams 30, namely, the shaded spotbeams 30A, 30B, 30D can be simultaneously broadcasting a program signal, while other spotbeams 30C, 30E may not broadcast the program signal. It can be further seen that some ATC cells 40' may not be located in a spotbeam 30. According to some embodiments of the invention, a user terminal located in a spotbeam, such as spotbeam 30E, in which the program signal is not being broadcast may request that the program signal be broadcast in its spotbeam 30E. However, even if the program signal is not broadcast in the spotbeam 30E in which the user terminal is located, the user terminal may still be able to receive the broadcast program signal by receiving, and possibly combining, broadcast program signals from an spotbeam, such as spotbeam 30A, 3B and/or 30D, that is adjacent to the spotbeam in which the user terminal is located and/or from an ATC cell 40 near the user terminal and that is broadcasting the program signal.

Selective spotbeam multicasting, according to some embodiments of the invention, allows satellite broadcasting, which consumes substantial satellite AEIRP, to be prioritized by geographic area. Further, by making the selectivity adaptive, the broadcast service can become demand-pulled.

In order to turn on spotbeams selectively, it is desirable to know where the users are. This knowledge may be acquired, in some embodiments, by leveraging the mobility management functions of traditional wireless communications protocols, which may be modified, according to some embodiments of the invention, to support the exchange of information to manage the spotbeam lighting function.

Figure 4:
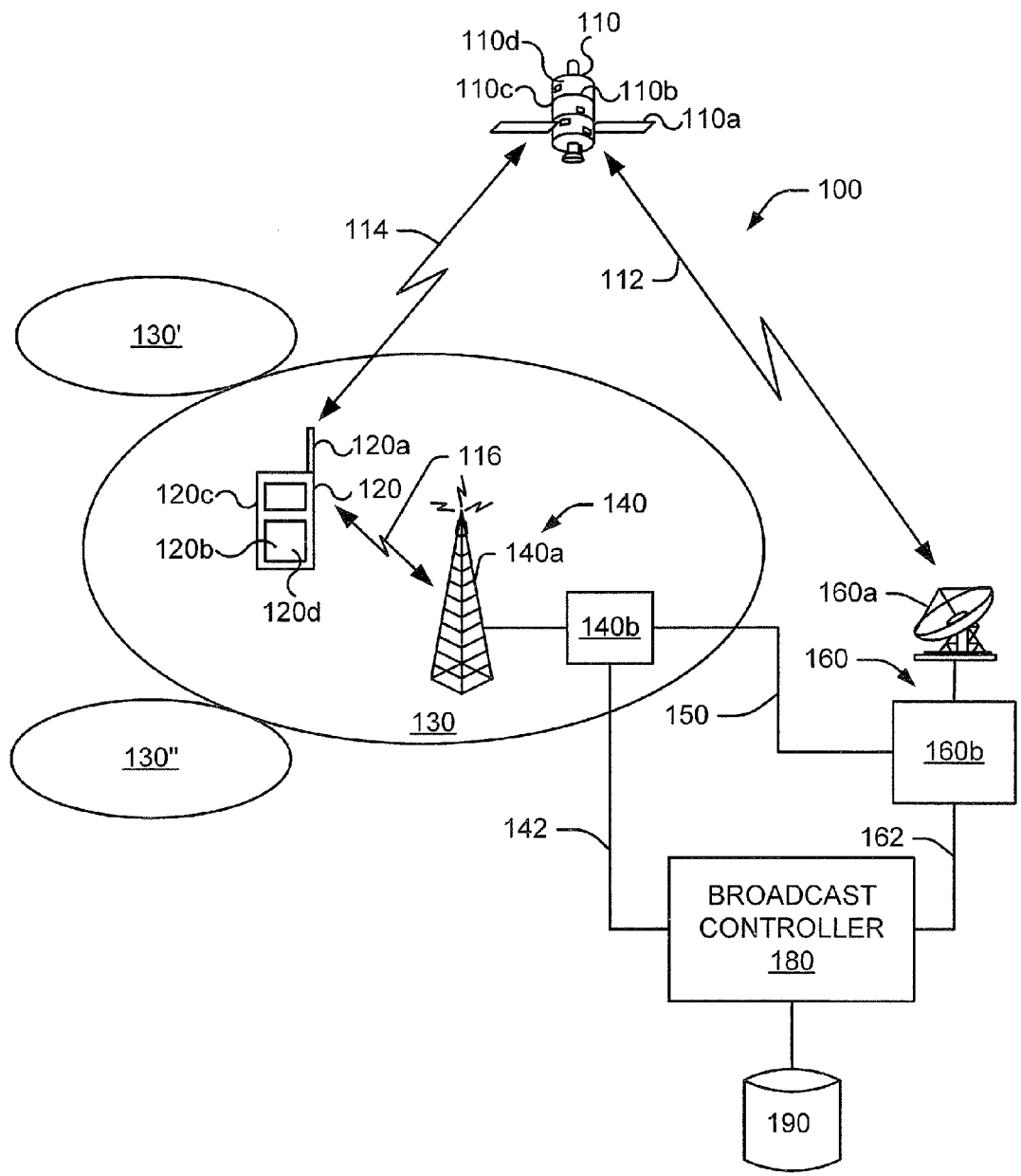
FIG. 4 is a schematic diagram illustrating a system for delivering broadcast content to mobile terminals using a cellular satellite communications system in conjunction with an ancillary terrestrial component.

FIG. 4 is a schematic diagram of cellular satellite communications systems and methods that may be used to provide both mobility management and program broadcast services according to embodiments of the invention. As shown in FIG. 4, these cellular satellite communications systems and methods 100 include a Space-Based Component (SBC) that may include one or more geostationary or non-geostationary orbiting satellites 110. The space-based component may be configured to selectively use/reuse geographically a set of frequencies and to transmit wireless communications signals via a communication link 114 to a plurality of wireless terminals, only one of which (terminal 120) is illustrated in FIG. 1, in a satellite footprint including one or more satellite cells 130-130", over one or more satellite forward service link (downlink) frequencies $f_D$. The space-based component may also be configured to receive wireless communications from a plurality of wireless terminals, such as user terminal 120 in the satellite cell 130, over one or more satellite return service link (uplink) frequencies $f_U$.

In generate, the satellite 110 may include an antenna 110a mounted on a satellite body 110c. A satellite transceiver 110b is housed in the satellite body 110c and is coupled to the antenna 110a. The satellite transceiver 110b is configured to communicate with elements of the cellular satellite communications system 100, such as the user terminal 120 and a satellite gateway 160, via a satellite air interface over satellite communication frequencies, including satellite forward and reverse service link and feeder link frequencies in response to control signals from a satellite control circuit 110d.

A cellular satellite communications system 100 may include an ancillary terrestrial network (ATN) including at least one ancillary terrestrial component (ATC) 140, which may include a Base Transceiver System (BTS) having an antenna 140a and an electronics system 140b. The ATC 140 is configured to receive wireless communications signals from, for example, at least one user terminal 120 located within an ATC cell served by the ATC 140 via a communication link 116. In some embodiments, the ATN of the cellular satellite communications system 100 uses/reuses satellite frequencies terrestrially. A cellular satellite communications system may provide users with increased mobility/functionality and/or may provide increased frequency reuse.

In general, the user terminal 120 may include a wireless terminal having a housing 120c, an antenna 120a coupled to the housing, and a transceiver 120b coupled to the antenna 120a and configured to communicate with the cellular satellite communications system 100 via a satellite air interface over satellite communication frequencies, including satellite service link forward and reverse frequencies, in response to control signals from a control circuit 120d.

As noted above, a user terminal 120 (also referred to herein as a mobile station, or MS) of the cellular satellite communications system 100 may communicate with the SBC 110 using an uplink frequency $f_U$ within the satellite frequency band. In order to provide increased frequency utilization in a cellular satellite communications system 100, the user terminal 120 of the cellular satellite communications system 100 may also communicate with the terrestrial ATC 140 using an uplink frequency $f'_U$ within the satellite frequency band. The frequency $f'_U$ may be the same as an uplink or downlink frequency used for communicating with the satellite 110 in the satellite cell 130 in which the user terminal 120 is located and/or in an adjacent or remotely-located satellite cell 130. Thus, as illustrated in FIG. 1, the user terminal 120 may communicate with the space-based component including the satellite 110 using a frequency in the satellite frequency band and may subsequently communicate with the ancillary terrestrial component 140, also using a frequency in the satellite frequency band. The space-based component 110 may also undesirably receive a component of the wireless communications between the user terminal 120 and the ATC 140 in the satellite cell 130 as interference. In addition, the satellite 110 may receive, as interference, a component of wireless communications from a wireless terminal and/or BTS (not shown) located in a different satellite cell over a satellite frequency that may be the same as (and/or overlapping with) $f_U$ and/or $f'_U$. However, systems and methods have been developed to reduce/mitigate the interference caused by terrestrial use/reuse of satellite frequencies in a cellular satellite communications system.

Still referring to FIG. 4, embodiments of satellite communications systems/methods 100 can include at least one satellite gateway 160 that can include an antenna 160*a* and an electronics system 160*b*. The satellite gateway 160 may be connected to other networks, including terrestrial and/or other wired and/or wireless communications networks such as, for example, a public switched telephone network and/or the Internet. The satellite gateway 160 communicates with the satellite 110 over a satellite feeder link 112. The satellite gateway 160 may also be configured to communicate with one or more ATCs 140 in the ancillary terrestrial network, generally over a terrestrial link 150.

The satellite gateway 160 may communicate with the ATC 140 via a communications link 150, which may be used to coordinate communications of the ATC 140 and the satellite 110 in order to, among other things, reduce interference between the ancillary terrestrial network and the satellite 110.

Also illustrated in FIG. 4 is a broadcast controller 180 that communicates with the ATC 140 over a communication link 142 and with the satellite gateway 160 over a communication link 162. The broadcast controller 180 is configured to provide broadcast program signals to the satellite 110 and/or the ATC 140 and to monitor the transmission of broadcast program signals by the satellite 110 and/or the ATC 140. The broadcast controller 180 may also include a database 190 of subscriber information, such as subscriber program preference information, subscriber subscription information and/or subscriber authentication information, as described in more detail below. It will be appreciated that, although the broadcast controller 180 is illustrated in FIG. 4 as a separate element that is distinct from the gateway 160 and the ATC 140, the broadcast controller 180 may be implemented within the gateway 160 or the ATC 140, or partially within both the gateway 160 and the ATC 140. Moreover, while the database 190 is illustrated in FIG. 4 as included within/attached to the broadcast controller 180, it will be appreciated that the database 190 may be implemented within the gateway 160 and/or the ATC 140 and/or may be implemented as a standalone database that may be accessed by the broadcast controller 180 over a wide are network or local area network.

In some embodiments, the broadcast controller 180 may control the broadcast of a program signal by the satellite gateway 160 and/or the ATC 140. For example, the broadcast controller may initiate a broadcast by transmitting a program signal in real time to the satellite gateway 160 and/or the ATC 140, which may then retransmit the program signal to one or more satellite spotbeams and/or ATC cells depending on the presence in such spotbeam(s) and/or cell(s) of a threshold number of subscribed user terminals 120.

In some embodiments, the presence of a subscribed user terminal 120 in a cell may be determined by the broadcast controller 120 in cooperation with the satellite gateway 160 and/or ATC 140. For example, when a user terminal 120 enters a satellite spotbeam or an ATC cell (as indicated, for example, by the user terminal 120 performing a location update in the spotbeam or cell), the satellite gateway 160 (in the case of a user terminal 120 entering a spotbeam) or the ATC 140 (in the case of a user terminal 120 entering an ATC cell) may send a notification to the broadcast controller 180 identifying the user terminal 120. The notification may also include authentication information about the user terminal 120. The broadcast controller 180 may retrieve a profile associated with the user terminal 120 from the database 190 and check the profile to determine if the user terminal 120 is associated with a subscription to a program that is currently being broadcast by the broadcast controller 180. If applicable, the broadcast controller may also verify the authenticity of the user terminal 120.

If the user terminal 120 is associated with a currently broadcast program and, if applicable, the user terminal 120 has been authenticated, the broadcast controller 180 may send a notification to the ATC 140 (if the user terminal 120 is registered in an ATC cell) or the satellite gateway 160 (if the user terminal 120 is registered in a spotbeam) informing that the user terminal 120 should receive the broadcast signal.

Once the satellite gateway 160 receives an indication from the broadcast controller 180 that the user terminal 120 is eligible and should receive the broadcast signal, the satellite gateway 160 may determine if the broadcast signal is currently being broadcast in the spotbeam in which the user terminal 120 is located. If so, the satellite gateway 160 may transmit intelligence regarding the broadcast signal to the user terminal 120, such as the channel, spreading code, time slot, subchannel(s), etc., on which the program signal is being transmitted.

If the program signal is not currently being broadcast in the spotbeam in which the user terminal 120 is located, the satellite gateway 160 may determine if the broadcast signal is currently being broadcast in an adjacent spotbeam and/or by an ATC 140 near the user terminal 120. If so, the satellite gateway 160 transmit information to the user terminal 120, such as the channel, spreading code, time slot, subchannel(s), etc., on which the program signal is being transmitted in adjacent spotbeam(s) and/or by nearby ATC(s). The user terminal 120 may then attempt to receive one or more of the program signals broadcast in adjacent spotbeam(s) and/or ATC cells.

In some embodiments, the determination of authenticity and/or eligibility of a user terminal 120 to receive a particular broadcast signal may be determined by the satellite gateway 160 based on information, such as a subscriber profile, stored at the satellite gateway. In such embodiments, the broadcast controller 180 may be configured to provide the program signal to the satellite gateway 160, but need not participate in the authentication process.

In further embodiments, the decision to broadcast a program signal on a particular spotbeam may be made by the broadcast controller 180, which may, for example, instruct the satellite gateway 160 as to which spotbeams the program signal should be broadcast in. In such embodiments, the satellite gateway 160 may be configured to provide the broadcast controller 180 with realtime information about the identities of user terminals 120 entering and leaving various spotbeam(s) and/or ATC cells. The broadcast controller 180 may then decide what satellite spotbeam(s) and/or ATC cells the program signal should be transmitted in based, for example, on the presence or absence of subscribed user terminals 120 in or near the spotbeam(s)/cell(s) of the system 100.

Figure 5:
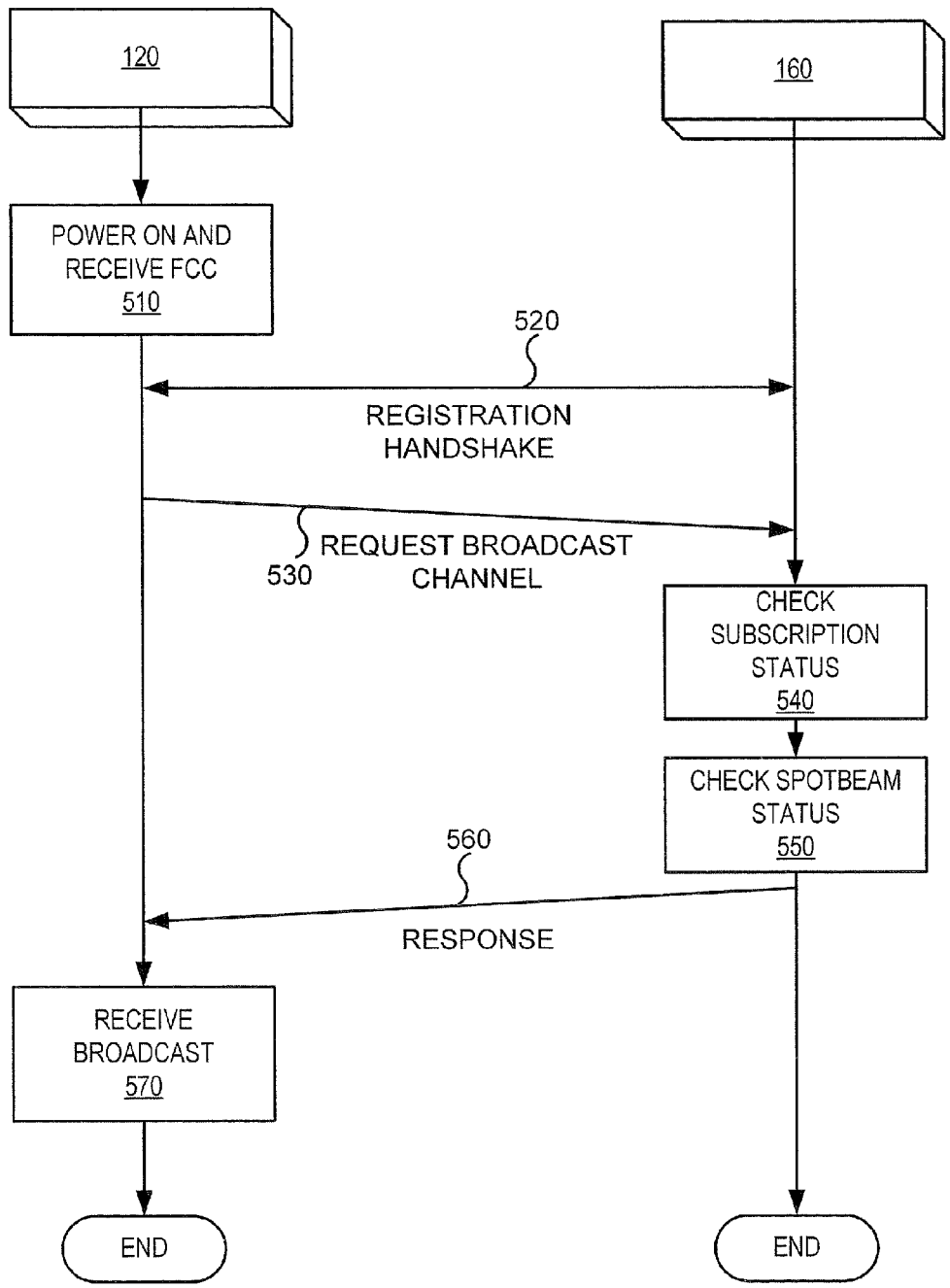
FIGS. 5 and 6 illustrate certain message flows between a user terminal and a satellite according to some embodiments of the invention.

FIG. 5 shows an example of protocols that may be used according to some embodiments of the invention. A potentially synergistic benefit of using mainstream wireless protocols to manage the spotbeam lighting function is that it may allow both broadcast and communications services to be efficiently offered as a package over the same wireless network and using the same user terminals, while potentially conserving network resources.

Systems, methods and/or protocols for managing a broadcast function according to some embodiments of the invention are described below and follow the ladder diagram in FIG. 5. With reference to FIGS. 4 and 5, a user terminal 120 located in a satellite service area powers on and receives a satellite forward control channel (FCC), such as the broadcast control channel (BCCH) in GSM (Block 510). The user terminal 120 then logs onto the cellular satellite communication system via a registration handshake procedure 520. The act of logging on, or registering, informs the satellite gateway 160 of the general location of the user terminal 120 relative to spotbeam identities (IDs) of the cellular satellite system 100. In cellular parlance, this is also referred to as performing a location update. Namely, the identity of the spotbeam in which the user terminal 120 is registered is recorded in the home location register (HLR) of the satellite network, which may be co-located with the satellite gateway. The user terminal 120 itself is identified by a unique identifier, such as an electronic serial number. A temporary station identifier, such as a TMSI used in GSM, may be assigned to the user terminal 120 to avoid repeatedly sending the electronic serial number of the user terminal 120 over the air interface.

Before the user terminal 120 is allowed to communicate, it may be authenticated by the cellular satellite communications system 100. In order to perform authentication, each user terminal 120 in the cellular satellite communications system 100 may be provided with a secret key, a copy of which may be stored, for example, in the subscriber information database 190. During authentication, the broadcast controller 180 generates a random number that is sent to the user terminal 120 by the SBC 110. Both the user terminal 120 and the broadcast controller 180 then use the random number and the subscriber's secret key to generate a signed response (SRES) according to a ciphering algorithm. The user terminal 120 sends the signed response back to the broadcast controller 180, which checks the SRES received from the user terminal against the internally generated SRES. If the SRES sent by the user terminal 120 matches the internally generated SRES, the user terminal 120 is considered authentic.

When the user of the user terminal 120 wants to receive a broadcast service, the user may select an appropriate menu item in the user interface of the user terminal 120. In response, the user terminal 120 sends a broadcast channel request message 530 to the satellite gateway 160, indicating that the user wishes to receive a specific video (or other content) broadcast channel. The message may be sent via a return control channel, as an application layer short message, such as SMS, and/or using other techniques. From the viewpoint of rapid response, the return control channel may be used.

In some embodiments, the broadcast channel request message 530 may include a requested channel number and an identification of the user terminal 120. The broadcast channel request message 530 may optionally include a precise user location obtained from a GPS receiver in the user terminal 120. Accordingly, the broadcast channel request message 530 may be formatted as follows:

request_broadcast_channel_ON {channel_no., MS_ID, GPS_based_user_location(optional)} where the channel_no. parameter identifies the particular broadcast channel, from potentially many channels, that the user wants to view. MS_ID is an ID that identifies the user terminal 120 and may be either a temporary ID assigned by the satellite gateway, similar to TMSI in GSM, or directly traceable to the electronic serial number of the user terminal, such as the IMSI (International Mobile Subscriber Identity) in GSM.

In some embodiments, the broadcast channel requested by the user terminal 120 may reserved for a closed user group, such as those users having a specific subscription. In that case, the satellite gateway 160 may check the subscription status of the user terminal 120 (block 540). The subscription status of the user terminal 120 may be checked by sending a message to the broadcast controller 180 via the communication link 162. The broadcast controller 180 may store the subscription status of each user terminal 120 that has subscribed to a broadcast service in the subscriber database 190. Once the subscription status of the user terminal 120 has been checked and it has been determined that the user terminal 120 is eligible to receive the requested broadcast channel, the gateway 160 may provide a special decryption key to the user terminal 120 to allow the user terminal 120 to decrypt, and thereby receive, the requested broadcast channel. The decryption key may itself be encrypted to prevent unwanted interception thereof. For example, the decryption key may be encrypted prior to being sent to the user terminal 120 such that it may be decrypted using the secret key held by the user terminal 120.

In addition to authentication of the user terminal 120, in some systems it may be desirable to authenticate the user of the user terminal 120, for example by requiring the user of the user terminal 120 to enter a password or other authentication code. Other techniques for performing user authentication and/or for providing different security levels may be used.

Assuming the identity and subscription status of the user terminal 120 and/or the user thereof have been authenticated, the gateway 160 checks whether the requested channel is already being beamed down in the spotbeam where the user is located (block 550). If the channel is already being beamed down in the user's spotbeam, and the broadcast service is open to all users that subscribe to the associated cellular service, the gateway 160 informs the user terminal 120 of the broadcast channel frequency and TDM time slot via a response message 560, assuming that multiple broadcast channels may be time division multiplexed onto a common broadcast carrier. In particular, the response message 560 sent to the user terminal 120 may take the following form:

response_broadcast_channel_{b/cast service availability (yes/no), b/cast freq. & time-slot assignment, user ID, decrypt. key}

If the broadcast channel frequency is the same as the frequency used for two-way communications with the user terminal 120, then the broadcast channel frequency may be indicated as a null parameter and only the TDM slot number may be identified. The TDM slot number will repeat according to a frame structure. The gateway 160 may also provide the user terminal 120 with a decryption key to allow the user terminal 120 to decrypt, and thereby receive, the requested broadcast channel. Assuming the broadcast channel is currently being beamed into the spot-beam, the user terminal 120 may then tune to the specified broadcast frequency and/or time slot and receive the broadcast channel (block 570).

Different information may be provided depending on the communication protocol used. For example, in a CDMA based system, the gateway 160 will inform the user terminal 120 of the broadcast channel spreading code, while in an OFDMA-based system, the gateway 150 may inform the user terminal 120 of the sub-carriers used for transmission of the broadcast channel.

If the broadcast service being requested by the user is not currently being beamed down by the satellite in the spotbeam in which the user terminal 120 is located, the following actions may be taken by the satellite network in some embodiments of the invention. It is checked if the user terminal 120 can receive carriers in adjacent or nearby spotbeams with sufficient signal to noise ratio so as to demodulate a combination of the carriers with a sufficiently high quality (e.g. low bit error rate) to meet minimum quality of service (QoS) requirements. This decision may be aided if the precise location of the user terminal 120 is known. Otherwise, the decision may be based, for example, on a worst case location of the user terminal 120 in the spotbeam, or based on an average or expected location of the user terminal 120 in the spotbeam. As noted above, there may be spillover power from an adjacent spotbeam that may enable the user terminal 120 to receive the program signal from the adjacent spotbeam with acceptable quality, even though the user terminal 120 is registered in a different spotbeam for purposes of mobility management in the cellular satellite communications system 100.

In some embodiments, a suitably designed user terminal 120 can combine, and in some embodiments can optimally combine, broadcast channel signals from multiple spotbeams, regardless of whether the channel signals use carriers of identical or different frequencies. That is, this technique is not limited to the case of K=1 (where K is the frequency reuse factor). The optimal combining can be performed by frequency translating all channel signals to complex baseband, performing carrier, frame and symbol synchronization, and combining the signals by maximal ratio techniques that weight the channel signals proportionally to the signal amplitude to noise power ratio of each channel.

During idle time slots, the user terminal 120 may retune to the two-way communications forward control channel and receive bulletin messages containing updated information about the neighboring spotbeam frequencies. The user terminal 120 may detect those frequencies to determine their received signal quality, and, referring to FIG. 6, may perform a location update 610 if required. It will be understood that protocols of FIGS. 5 and 6 can mirror cellular communication protocols such as GSM, and like the latter, may be performed over several idle time slots.

Figure 6:
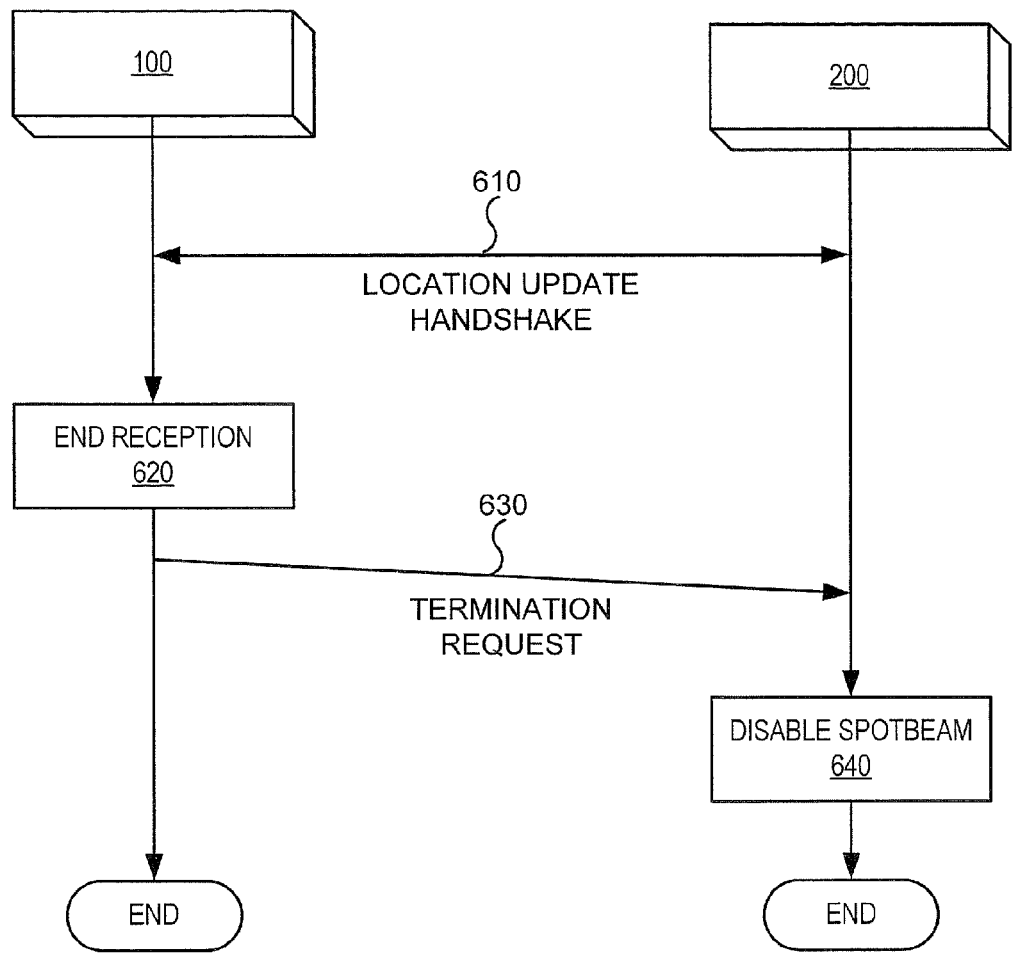

Referring still to FIG. 6, when the user terminal 120 decides to end reception of the broadcast signal (block 620), it may send a termination request 630 to the satellite gateway 160. The termination request 630 may be relayed by the satellite gateway 160 to the broadcast controller 180. The satellite gateway 160 and/or the broadcast controller 180 may disable (turn off) the broadcast channel within the spotbeam, if it is determined that fewer than a threshold number of mobile stations 120 are still receiving the broadcast program in the spotbeam (block 640), as discussed in more detail below.

In some embodiments, the broadcast service may be provided in a time division multiplexed (TDM) manner over the same frequency channel as the two-way communications. In this case, the complexity of re-tuning the MS to a dedicated broadcast channel on a separate frequency may be avoided. However, one reason to use a dedicated carrier for broadcast content is that it may be desirable to transmit broadcast content with lower protocol overheads than in two-way communications, thereby achieving greater throughput and/or requiring less bandwidth for the same effective throughput, which can result in superior user experience and/or reduction in costs/resource use.

Accordingly, a cellular satellite system 100 may reserve some forward bandwidth for broadcast service(s) that uses less protocol overhead than a conventional two-way communication interface requires. For example, the broadcast service channel may have less space for control channels and/or less space devoted to parity/CRC bits.

If the satellite gateway 160 determines that the user terminal 120 cannot receive the desired broadcast channel, either directly in the spotbeam in which it is situated, or by combining signals from adjacent/nearby spotbeams, the gateway 160 may turn on the desired channel in the spotbeam where the user terminal 120 is located. When the spotbeam is turned on, the necessary EIRP may be applied to the particular carrier and spotbeam associated with the user terminal 120. Similarly, when the last user terminal 120 that was receiving a particular broadcast channel leaves a spotbeam, the satellite gateway 160 may turn off the broadcast channel in that carrier and spotbeam, reducing the EIRP in that carrier and spotbeam. This is analogous to automatically turning light bulbs on and off in different rooms in a house, depending on whether there are people in the rooms. Accordingly, adaptive turning on or off of broadcast channels in spotbeams in response to the location of mobile stations 120 that are receiving the broadcast channels may be provided according to some embodiments of the present invention.

Additional policies for turning spotbeams on and off may be implemented according to other embodiments of the invention. These include not turning on spotbeams until the number of users desiring a particular broadcast channel exceeds a threshold number, the threshold number being greater than or equal to 1. Similarly, a spotbeam maybe turned off when the number of users drops below a threshold number. The users may not be able, or may no longer be able to receive the broadcast, but it will be understood that reception of broadcast content typically may not be guaranteed by the broadcast network.

In some embodiments of the invention, a user may provide to the satellite gateway 160 and/or the broadcast controller 180 a user profile that contains information relating to at least one preference of the user. In such embodiments, the system may be configured to track a location of a user terminal 120 associated with the user and provide information/content selectively to the user terminal 120 (substantially as the information becomes available to the system) responsive to the user profile. As stated earlier, the satellite gateway 160 and/or the broadcast controller 180 may also be configured to provide information/content on a geographically selective basis, using one or more antenna patterns of a space-based component (including at least one satellite 110), responsive to a measure of location of one or more user terminals 120.

As such, a user terminal 120 may be configured to provide an identity and/or a measure of its location to the satellite gateway 160 and/or the broadcast controller 180 following activation of the user terminal 120, periodically following activation of the user terminal 120, responsive to a change of location of the user terminal 120 and/or responsive to a change of signal strength and/or quality of a signal received at the user terminal 120 from the satellite 110. In further embodiments, one or more user terminals 120 selectively receiving information/content may be configured to provide to the satellite gateway 160 and/or the broadcast controller 180 a measure of signal strength and/or quality associated with the information that is being selectively received. Responsive to one or more received signal strength and/or quality measures, the satellite gateway 160 and/or the broadcast controller 180 may be configured to adjust a property of the information/content being selectively provided to the one or more user terminals 120. For example, the satellite gateway 160 and/or the broadcast controller 180 may be configured to adjust a signal level, data rate, bandwidth or other property of the information/content being provided.

As discussed above, a satellite broadcasting system and/or method according to some embodiments of the invention may be supplemented with an Ancillary Terrestrial Network (ATN) that includes a plurality of Ancillary Terrestrial Components (ATCs). It is known to provide terrestrial networks for cellular satellite radioterminal communications systems. In particular, terrestrial networks can enhance cellular satellite radioterminal system availability, efficiency and/or economic viability by terrestrially using and/or reusing at least some of the frequencies that are allocated to cellular satellite radioterminal systems. In particular, it is known that it may be difficult for cellular satellite radioterminal systems to reliably serve densely populated areas, because the satellite signal may be blocked by high-rise structures and/or may not penetrate into and/or out of buildings. As a result, the satellite spectrum may be underutilized or unutilized in such areas. The use of terrestrial retransmission/reception of at least some of the frequencies that are allocated to the cellular satellite radiotelephone system can reduce or eliminate this potential problem.

The capacity of a hybrid system, including terrestrial and satellite-based communications connectivity and configured to terrestrially use and/or reuse at least some of the satellite-band frequencies, may be higher than a corresponding satellite-only system, since terrestrial frequency reuse may be much denser than that of the satellite-only system. In fact, capacity may be enhanced where it may be most needed, i.e., in densely populated urban/industrial/commercial areas where the communications connectivity/signal(s) of a satellite-only system may be unreliable. As a result, a hybrid (satellite/terrestrial cellular) system that is configured to use and/or reuse terrestrially at least some of the frequencies of the satellite band may become more economically viable, as it may be able to serve more effectively and reliably a larger subscriber base.

Satellite radioterminal communications systems and methods that may employ terrestrial use and/or reuse of satellite frequencies by an Ancillary Terrestrial Network (ATN) including at least one Ancillary Terrestrial Component (ATC) are also described in U.S. Pat. Nos. 6,684,057 to Karabinis, entitled Systems and Methods for Terrestrial Reuse of Cellular Satellite Frequency Spectrum; 6,785,543 to Karabinis, entitled Filters for Combined Radiotelephone/GPS Terminals; 6,856,787 to Karabinis, entitled Wireless Communications Systems and Methods Using Satellite-Linked Remote Terminal Interface Subsystems; 6,859,652 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; and 6,879,829 to Dutta et al., entitled Systems and Methods for Handover Between Space Based and Terrestrial Radioterminal Communications, and For Monitoring Terrestrially Reused Satellite Frequencies At a Radioterminal to Reduce Potential Interference; and Published U.S. Patent Application Nos. US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2003/0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

According to some embodiments of the present invention, a broadcast network may be provided by using and/or reusing Mobile Satellite System (MSS) satellite frequencies terrestrially. According to other embodiments of the present invention, an ATN for a direct broadcast satellite (DBS) system can be provided by using/reusing DBS frequencies terrestrially. Other hybrid satellite and terrestrial broadcast systems may be provided by using and/or reusing satellite frequencies terrestrially and/or by using non-satellite frequencies terrestrially to simultaneously broadcast the same content as a satellite.

Figure 3B:
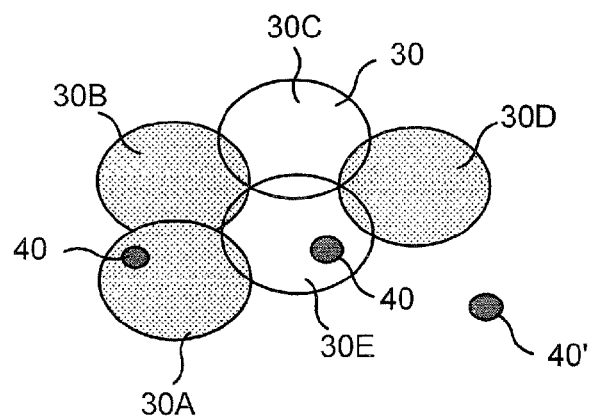

Moreover, as shown in FIG. 3, in some embodiments, the ATC 40 may be included within a spotbeam 30 that is activated, to allow more complete coverage in blind spots within the spotbeam 30. In yet other embodiments, as also illustrated in FIG. 3, an ATC 40 may be provided in an area where a spotbeam 30 is not located. Finally, in embodiments that provide adaptive turning on and off of spotbeams, the broadcast channel transmitted by selected ATCs may be turned on and off in substantial synchronism and/or with some hysteresis with the spot-beams 30 that are turned on and off. In particular, in some embodiments, an ATC 40 within a spotbeam 30 may be activated along with activation of the spotbeam 30, and in other embodiments, an ATC 40 within a spotbeam 30 may be activated upon deactivation of the spotbeam 30.

In some embodiments, the satellite gateway 160 may broadcast intelligence regarding programs being broadcast in a spotbeam 30, such as a program name or identity, broadcast channel, timeslot, spreading code, sub-carriers, etc., in a channel that may be monitored by user terminals 120 in the spotbeam 30, such as a broadcast control channel (BCC).

Such intelligence may be broadcast continuously in the spotbeam 30 and/or may be broadcast at regular or irregular intervals.

Furthermore, in some embodiments, if the program content is not currently being broadcast within the spotbeam 30, the satellite gateway 160 may broadcast in the spotbeam 30 an identifier of one or more broadcast channels in use within the spotbeam 30 (e.g. by an ATC 40 within the spotbeam 30) or close to the spotbeam 30 (e.g. within an adjacent spotbeam 30). The user terminal 120 may receive the identifier and attempt to receive the program content from the ATC 40 or an adjacent spotbeam 30 before requesting that the satellite gateway 160 turn on the program in the user's spotbeam 30. Thus, the user's spotbeam 30 may be turned on only if the user terminal 120 cannot receive the program content from either an adjacent spotbeam 30 or from an ATC 40.

Figure 7:
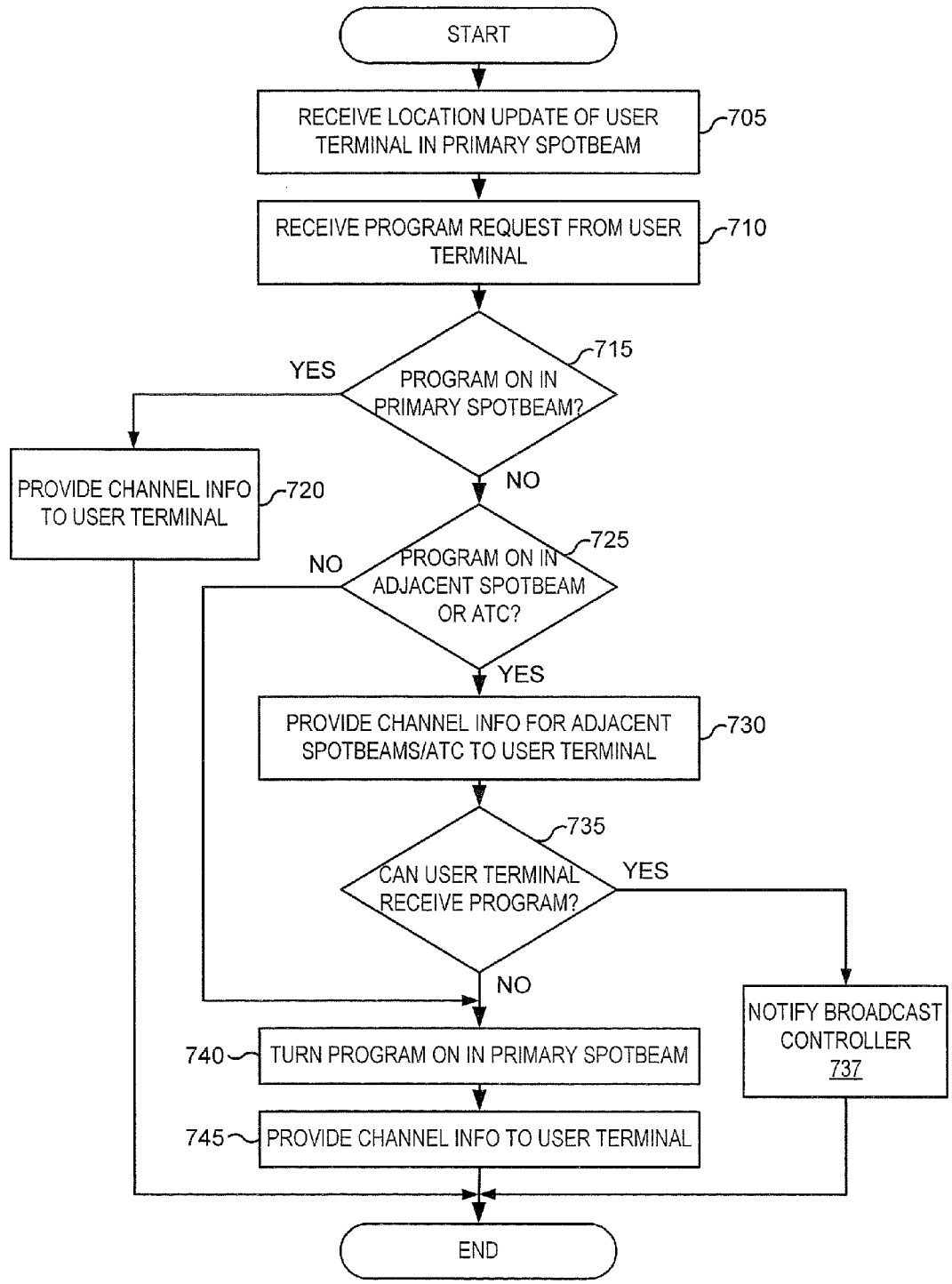
FIGS. 7, 8 and 9 are flowcharts illustrating operations for delivering broadcast content to user terminals using a cellular satellite communications system in conjunction with an ancillary terrestrial component according to some embodiments of the invention.
Figure 8:
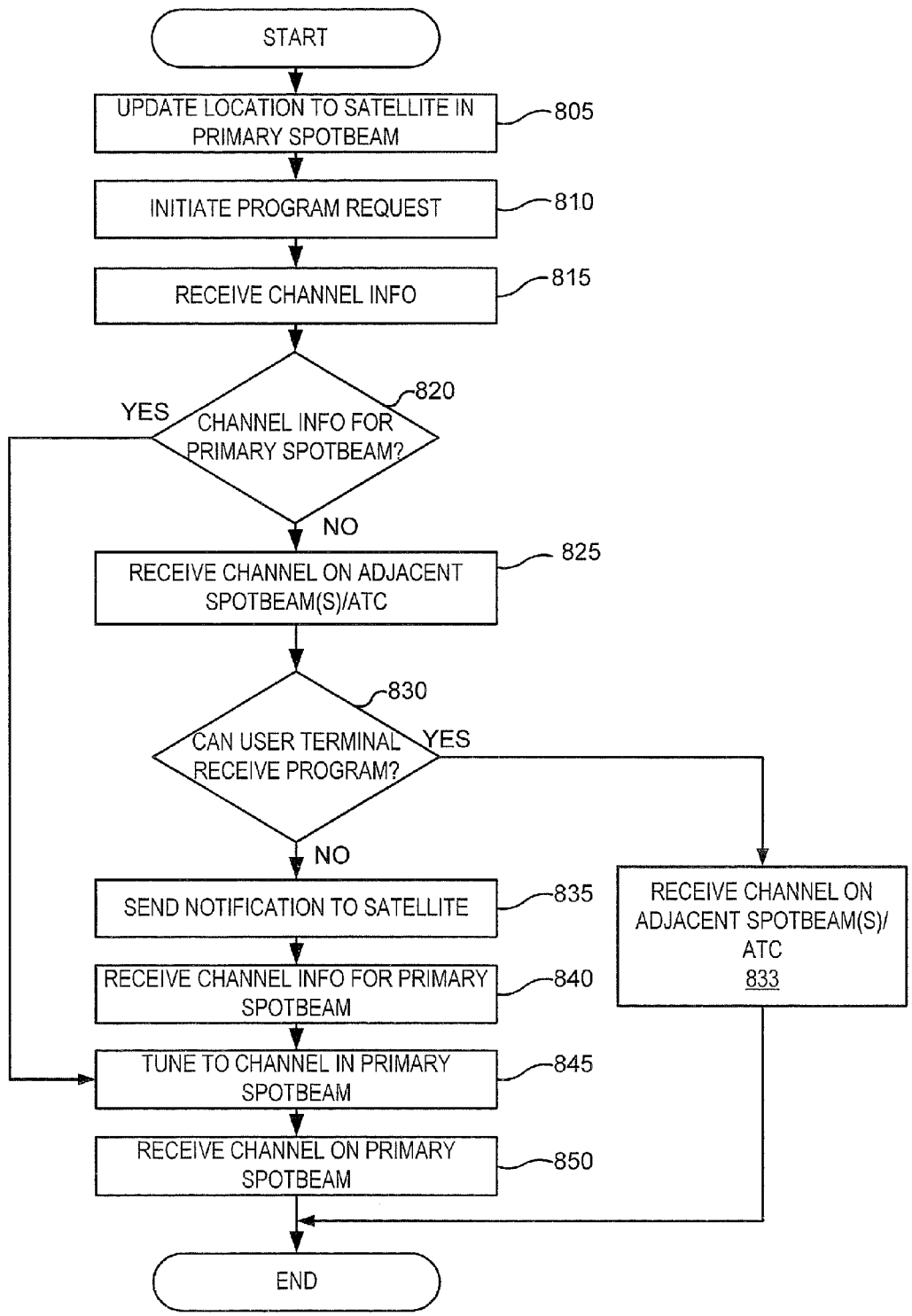

Some embodiments of the present invention are illustrated in the flowchart diagrams of FIGS. 7 and 8. Referring to FIG. 7 (in conjunction with FIG. 4), a satellite gateway 160 may receive a location update from a user terminal 120 that is located in a spotbeam 30 (referred to herein as a primary spotbeam) (block 705). The satellite gateway 160 may then receive a program request (request_broadcast_channel_ON) message from the user terminal 120 (block 710). The program request may be processed by the gateway 160 and/or may be forwarded to the broadcast controller 180. In the following discussion, it will be assumed that the broadcast controller 180 performs function such as user authentication and subscription verification. Furthermore, the satellite gateway 160 may perform certain functions, such as selective activation and deactivation of broadcast channels in particular spotbeams in response to program requests from user terminals and/or in response to commands from the broadcast controller 180. Similarly, an ATC 40 may selectively initiate and terminate the termination of broadcast channels in response to commands from the broadcast controller 180.

Upon receipt of the program request from the user terminal 120, and subsequent authentication of the user and/or confirmation of the user's subscription status, the broadcast controller 180 checks to determine if the broadcast program is currently being broadcast in the primary spotbeam (block 715). If the program is on in the primary spotbeam, the broadcast controller 180 and/or the satellite gateway 160 may provide information regarding the broadcast channel to the user terminal 120 (block 720). For example, as described above, the satellite gateway 160 may provide the user terminal 120 with information concerning the broadcast, such as the broadcast frequency, timeslot, spreading code, decryption key, and the like. The user terminal 120 may then receive the broadcast channel in the primary spotbeam.

In some embodiments, the user terminal 120 may obtain information regarding the program, such as the broadcast channel, frequency, timeslot, spreading code, etc., from control channel transmissions. In such case, the satellite gateway 160 may only need to provide the user terminal 120 with a decryption key to permit the user terminal to receive the broadcast program.

If the program is not currently being broadcast in the primary spotbeam, the broadcast controller 180 and/or the satellite gateway 160 may determine if the program is on in an adjacent spotbeam and/or is being broadcast by an ATC 140 within the primary spotbeam or otherwise near the location of the user terminal 120 (block 725). If the program is currently on an adjacent spotbeam or in an ATC in the primary spotbeam, the broadcast controller 180 and/or the satellite gateway 160 may provide channel information for the broadcast channel in the adjacent spotbeam(s) and/or the ATC to the user terminal 120 (block 730). The user terminal 120 may then attempt to receive the broadcast channel from the adjacent spotbeam(s) and/or the ATC. If the user terminal 120 is able to receive the broadcast program from the adjacent spotbeam(s) and or ATC with a sufficient quality of service (block 735), then the user terminal 120 notifies the broadcast controller 180 that it is able to receive the broadcast program (block 737), and proceeds to do so. However, if the user terminal 120 is not able to receive the broadcast program from an adjacent spotbeam or an ATC, the broadcast controller 180 may instruct the gateway 160 to turn the broadcast program on in the primary spotbeam (block 740). The satellite gateway 160 then provides channel information for the broadcast channel in the primary spotbeam to the user terminal 120 (block 745).

Operations that may be performed by a user terminal 120 according to some embodiments of the invention are illustrated in FIG. 8. As shown therein, when an user terminal 120 is turned on (or enters a satellite spotbeam), it performs a location update to register its location in the spotbeam (referred to herein as the primary spotbeam) with the satellite gateway 160 (block 805). The user terminal 120 may then initiate a program request by sending a program request message to the satellite gateway 160 (block 810). In response, the user terminal 120 receives channel information from the gateway 160 (block 815). The user terminal 120 then determines if the channel information received from the satellite gateway 160 is for the primary spotbeam in which the user terminal 120 is located or for one or more adjacent spot-beams/ATCs (block 820). If the channel information is for the primary spotbeam, the user terminal 120 then tunes to the specified channel/frequency in the primary spotbeam (block 845) and receives the broadcast channel in the primary spotbeam (block 850).

If, at block 820, it is determined that the channel information provided by the satellite gateway 160 is for one or more adjacent spotbeam(s)/ATCs, the user terminal 120 attempts to receive the broadcast channel on the specified channel/frequency/timeslot of the adjacent spotbeam(s)/ATC(s) (block 825).

If, at block 830, it is determined that the user terminal 120 is able to successfully receive the broadcast program on the adjacent channel spotbeam(s)/ATC with an acceptable level of quality (as determined, for example, by bit error rate, signal to noise ratio, or other metric), then the user terminal 120 continues to receive the broadcast channel in that manner (block 833). If, however, it is determined that the user terminal 120 cannot receive the broadcast program from the adjacent spotbeam/ATC with an acceptable quality level, the user terminal 120 sends appropriate notification to the satellite gateway 160 (block 835). The user terminal 120 then waits to receive channel information for the primary spotbeam, assuming that the satellite gateway 160 and/or the broadcast controller 180 will turn on the broadcast channel in the primary spotbeam. Once the channel information for the primary spotbeam has been received, the user terminal 120 may tune to the specified channel in the primary spotbeam (block 845) and receive the channel on the primary spotbeam (block 850).

Figure 9:
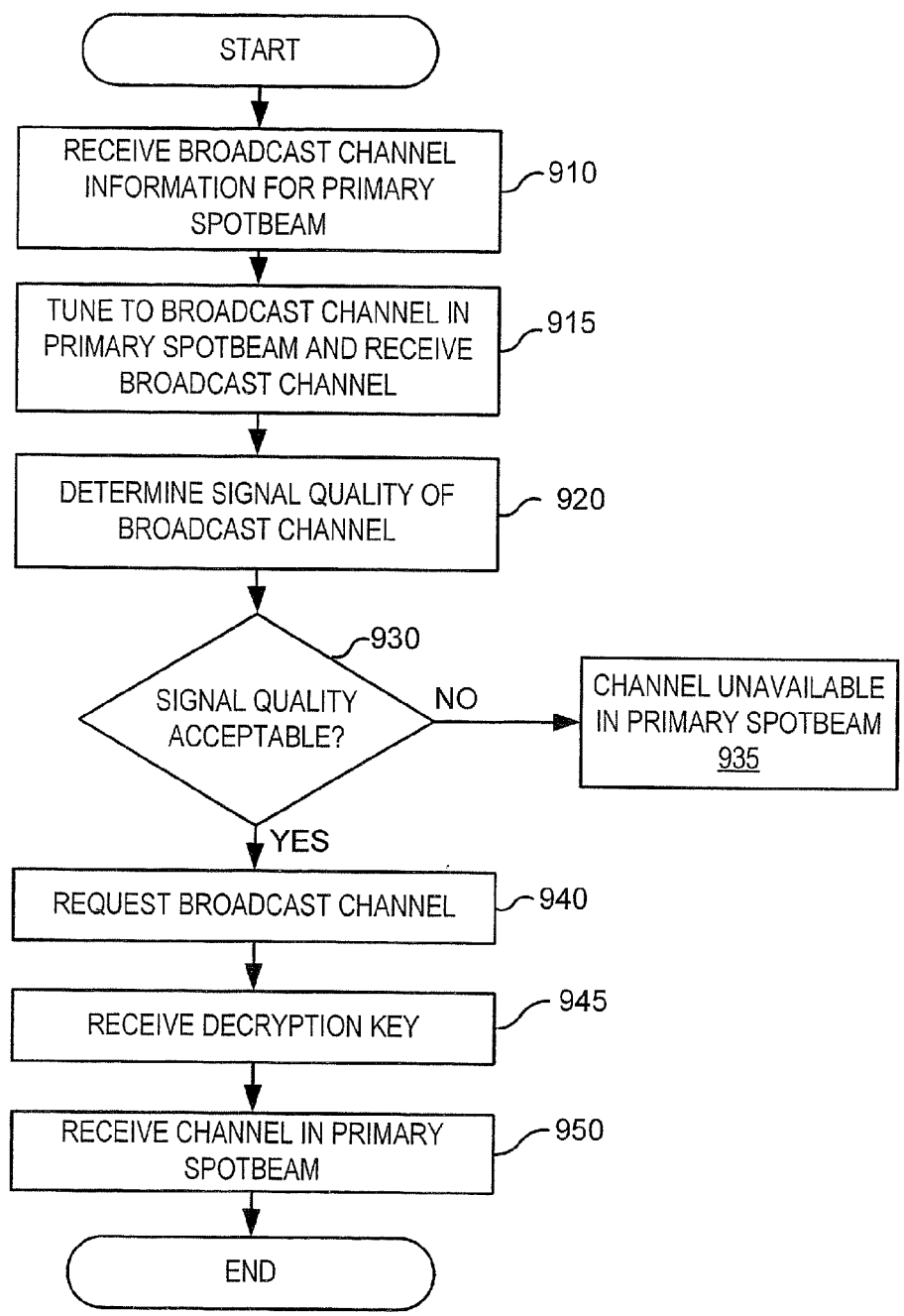

Operations according to further embodiments of the invention are illustrated in the flowchart of FIG. 9. As note above, in some embodiments of the invention, intelligence regarding the broadcast of a program signal may be broadcast continuously or periodically via a control channel, such as a broadcast control channel, within a spotbeam. Referring to FIG. 9, a user terminal 120 that desires to receive a particular broadcast program may receive broadcast channel information (intelligence) for the broadcast of the program in the spotbeam in which the user terminal 120 is located (block 910). For example, the user terminal may receive information about the channel, timeslot, spreading code, sub-carriers, etc., on which the program signal is being broadcast within the user's spotbeam (also referred to herein as the "primary spotbeam").

The user terminal 120 may then tune to the specified broadcast channel and attempt to receive the program signal (block 915). The program signal may include an encrypted portion corresponding to the broadcast program and an unencrypted portion corresponding to header information that is broadcast along with the program. Using unencrypted header information, training signals, and/or other known signals, the user terminal 120 may determine a signal strength/quality of the broadcast channel (block 920). The signal strength/quality may be determined as a signal to noise ratio (SNR), a bit error rate, or some other measure of signal strength and/or quality. The measure is compared against a minimum threshold (block 930) to determine if the received signal quality is acceptable.

If the received signal quality is too low, the broadcast channel may be unavailable to the user terminal 120 in the primary spotbeam, even though it is currently being broadcast in the user's spotbeam. In that case, the user terminal 120 may attempt to receive the signal from an ATC and/or an adjacent spotbeam as described above. In that case, the user terminal 120 may request broadcast information from the gateway 160 regarding the broadcast of the program signal in a nearby ATC and/or an adjacent spotbeam.

If, however, the signal quality of the signal broadcast in the user's spotbeam is acceptable, the user terminal 120 may request the broadcast channel (block 940). In response, the satellite gateway 160 may send the user terminal a decryption key that can be used to decrypt the broadcast program signal (block 945). As noted above, the decryption key may itself be encrypted, for example, to prevent unauthorized use of the key. Once the user terminal 120 has received, and possibly decrypted, the decryption key, the user terminal 120 may commence to receive the broadcast program signal in the user's spotbeam.

A hybrid MSS-ATC network may implement a broadcast service exploiting certain features that are particular to the above type of network. These include use of the same frequency and/or band of frequencies for the satellite downlink and the terrestrial downlink. In contrast to, for example, XM-Satellite Radio wherein a terrestrial component receives content/information from a satellite and subsequently re-transmits the content terrestrially, a terrestrial component, according to embodiments of the present invention may be configured to receive content from a terrestrial source, thereby relieving the satellite of spectrum usage and/or power consumption.

Streaming content may be broadcast simultaneously on a satellite spotbeam carrier and on a terrestrial carrier, where the satellite spotbeam covers at least some of the same geographic area as the terrestrial carrier. The same and/or overlapping frequency bands may be used for satellite and terrestrial broadcasts. The satellite-delivered and terrestrially delivered channels may need to be isolated so as not to cause mutual interference in regions where both may be received with similar signal strengths. This isolation may be provided on one or more of the following and/or other bases:

1. Different time slots in a TDM based air interface. The satellite-delivered and terrestrially-delivered content may be carried in different forward-link TDM channels.
2. Different codes in a CDMA based air interface. The satellite-delivered and terrestrially-delivered content may be carried in different forward-link CDMA channels. The codes may be orthogonal (such as Walsh codes) or quasi-orthogonal, such and pseudo-noise (PN) codes.
3. Different time-frequency based subchannels in an OFDM air interface. The satellite-delivered and terrestrially-delivered content may be carried in different OFDM channels.
4. Time domain separation by user device. The isolation may be created at the user device by separating the satellite-delivered and terrestrially-delivered signals in the time-delay domain, when the two signals may be identical in other attributes. The time delay may be created by the substantially greater satellite radio propagation delay (approximately 250 ms for a geosynchronous satellite) relative to the delays incurred by the terrestrial radio link and base station backhaul. The air interface may need to have features enabling time domain separation of the two signals. This may be achieved by the use of spread spectrum carriers, as in CDMA. When spread spectrum carriers are used, for example, using direct sequence spreading, a cross-correlation (Rake) receiver, whose code-phase search window is tuned to the mean satellite propagation delay, allows the satellite-delivered copy to be separated from the terrestrial copies, provided the direct sequence spreading code has a repetition period much greater than at least 2× the satellite propagation delay.

Accordingly, embodiments of the present invention may provide one or more of the following:

1. A satellite broadcast service based on spotbeam multicasting, wherein the same information/content is transmitted simultaneously on multiple spotbeams.
2. A satellite broadcast service based on spotbeam multicasting, where the number of spotbeams in which the broadcast service is offered is less than the total number of spotbeams in the system.
3. A satellite broadcast service based on spotbeam multicasting, where the identities of the spotbeams in which the broadcast service is offered are selected adaptively based on the location of users requesting the broadcast service.
4. Techniques of spotbeam selection based on the mobility management methods used by a communications service that is offered concurrently with the broadcast service, as described above.
5. A satellite broadcast receiver, which performs diversity combining of signals from multiple spotbeams and/or from a spotbeam and an ATC.
6. Methods of selectively providing information to a communications device responsive to at least one user preference associated with the communications device and/or a measure of location of the communications device.
7. The use of the same frequency and/or frequency band on the space segment and the ground segment (ATC) of a hybrid network offering a common broadcast service.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of receiving information broadcast in a satellite spotbeam at a user terminal, comprising:
   registering the user terminal in the satellite spotbeam;
   receiving from a satellite associated with the satellite spotbeam intelligence about the information, wherein the intelligence identifies a start time, end time, time slot, frequency, spreading code or subchannel(s) associated with the information;

tuning a receiver in the user terminal to the time slot, frequency, spreading code or subchannel(s) identified in the intelligence;

receiving components of the information from an adjacent spotbeam and from an ancillary terrestrial component; and combining at least one signal from the adjacent spotbeam with a signal from the ancillary terrestrial component.

2. A method of receiving information broadcast in a satellite spotbeam at a user terminal, comprising:

registering the user terminal in the satellite spotbeam;

receiving from a satellite associated with the satellite spotbeam intelligence about the information, wherein the intelligence identifies a start time, end time, time slot, frequency, spreading code or subchannel(s) associated with the information; and tuning a receiver in the user terminal to the time slot, frequency, spreading code or subchannel(s) identified in the intelligence;

receiving components of the information from an adjacent spotbeam and from an ancillary terrestrial component; and frequency translating the components, performing carrier, frame and/or symbol synchronization on the components, and combining the components.

3. The method of claim 2, further comprising determining a signal to noise power ratio of at least one of the components, wherein combining is performed in response to the at least one signal to noise power ratio.

4. A wireless user terminal for use in a cellular satellite communications system, the wireless user terminal comprising:

an antenna;

a transceiver coupled to the antenna and configured to communicate with the cellular satellite communications system via a satellite air interface over satellite communication frequencies, including satellite service link forward and reverse frequencies; and a control circuit configured to:

register the user terminal in the satellite spotbeam;

receive from a satellite associated with the satellite spotbeam intelligence about the information, wherein the intelligence identifies a start time, end time, time slot, frequency, spreading code or subchannel(s) associated with the information;

tune the transceiver in the user terminal to the time slot, frequency, spreading code or subchannel(s) identified in the intelligence; and receive components of the information from an adjacent spotbeam and from an ancillary terrestrial component;

combine at least one signal from the adjacent spotbeam with a signal from the ancillary terrestrial component.

5. A wireless user terminal for use in a cellular satellite communications system, the wireless user terminal comprising:

an antenna;

a transceiver coupled to the antenna and configured to communicate with the cellular satellite communications system via a satellite air interface over satellite communication frequencies, including satellite service link forward and reverse frequencies; and a control circuit configured to:

register the user terminal in the satellite spotbeam;

receive from a satellite associated with the satellite spotbeam intelligence about the information, wherein the intelligence identifies a start time, end time, time slot, frequency, spreading code or subchannel(s) associated with the information;

tune the transceiver in the user terminal to the time slot, frequency, spreading code or subchannel(s) identified in the intelligence;

receive components of the information from an adjacent spotbeam and from an ancillary terrestrial component; and frequency translate the components, to perform carrier, frame and/or symbol synchronization on the components, and to combine the components.

6. The wireless user terminal of claim 5, wherein the control circuit is further configured to determine a signal to noise power ratio of at least one of the components, wherein the control circuit is further configured to combine the components in response to the at least one signal to noise power ratio.

* * * * *